Figure 1:
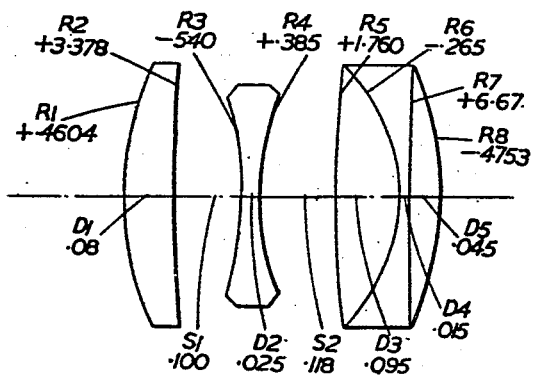

April 2, 1946.  A. WARMISHAM ET AL  2,397,714

OPTICAL OBJECTIVE

Filed July 2, 1943

Inventors
A. Warmisham +
By G. G. Wynne.
Attorneys

Patented Apr. 2, 1946

2,397,714

UNITED STATES PATENT OFFICE 2,397,714

OPTICAL OBJECTIVE

Arthur Warmisham and Charles Gorrie Wynne,
Leicester, England

Application July 2, 1943, Serial No. 493,277
In Great Britain August 26, 1942

15 Claims. (Cl. 88—57)

This invention relates to an optical objective of the kind forming the subject of the present applicants' copending U. S. patent application Serial No. 423,118, filed December 15, 1941 and which has now become United States Patent No. 2,319,171. The invention of such prior application relates to optical objectives for photographic or like purposes, comprising two or more divergent elements and two or more convergent elements, and corrected for spherical and chromatic aberrations, coma, astigmatism, curvature of field and distortion, and having small zonal spherical aberration, and has for its object to provide good correction for secondary spectrum without sacrificing correction for astigmatism field curvature and distortion.

This object is achieved according to the invention of the prior application by employing an alkaline halide crystal for one of its divergent elements and optical glass for the remaining elements, the objective approximately fulfilling the two equations $$\sum \frac{m_p^2}{f_p} \cdot \frac{1}{V_p} = 0 \text{ and } \sum \frac{m_p^2}{f_p} \cdot \frac{\theta_p}{V_p} = 0,$$

wherein $m_p$, $f_p$, $V_p$ and $\theta_p$ respectively represent the magnification, the focal length, the Abbe V number and the relative partial dispersion of an element $p$ of the objective, and the symbol $\Sigma$ indicates algebraical summation of the expressions for all the elements of the objective. It should be made clear that the magnification $m_p$, herein referred to, may be defined as being equal to the ratio $h_p/h_1$, where $h_p$ and $h_1$ are respectively the ordinates of the point of intersection with the lens element $p$ and with the first lens element of a paraxial ray of the wave-length of the D-line through the conjugate points for which the objective is corrected, and also that $V_p$ and $\theta_p$ have their usual significance, namely $$V_p = \frac{n_D - 1}{n_F - n_C} \text{ and } \theta_p = \frac{n_g - n_e}{n_F - n_C}$$

where $n_C$, $n_D$, $n_e$, $n_F$ and $n_g$ are respectively the refractive indices of the element $p$ for the lines C, D, e, F and g. The prior application describes and claims more especially the application of this invention to objectives of the kind having two compound divergent components located between two simple convergent components and each comprising a divergent element compounded with a convergent element. In such objectives, preferably, one divergent element is made of an alkaline halide crystal and the other of dense flint glass and at least one of the convergent elements is made of a glass having an Abbe V number less than 50.

The objective according to the present invention comprises a simple divergent component located between two convergent components, of which one is simple and the other is of triplet construction having a divergent element made of potassium bromide crystal cemented between two convergent elements of optical glass. The divergent simple middle component is preferably made of dense flint glass, and one of the convergent elements cemented to the crystal element may also be made of dense flint glass. The simple convergent component may be made of crown glass.

Figure 2:
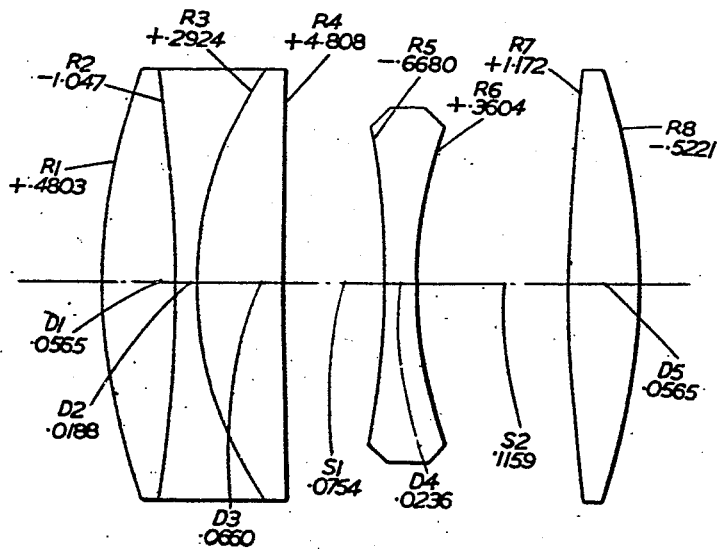

In the accompanying drawing,

Figures 1 and 2 respectively show two convenient practical examples of objective according to the invention.

Numerical data for these two examples are given in the following tables, in which $R_1$ $R_2$ ... represent the radii of curvature of the individual lens surfaces, the positive sign indicating that the surface is convex to the front (that is to the side of the longer conjugate) and the negative sign that it is concave thereto, $D_1$ $D_2$ ... represent the axial thicknesses of the individual elements, and $S_1$ $S_2$ the axial air separations between the individual components. The tables also give the mean refractive index $n_D$ for the D-line, the Abbe V number and the relative partial dispersion $\theta$ for the materials used for the individual elements.

*Example I*

Equivalent focal length 1.000    Relative aperture F/2.7

| Radius | Thickness or air separation | Refractive index $n_D$ | Abbe V number | Relative partial dispersion |
|---|---|---|---|---|
| $R_1+$ .4604 | $D_1$ .08 | 1.610 | 53.5 | 1.016 |
| $R_2+$ 3.378 | $S_1$ .100 | | | |
| $R_3-$ .540 | $D_2$ .025 | 1.6214 | 36.1 | 1.051 |
| $R_4+$ .385 | $S_2$ .118 | | | |
| $R_5+$ 1.760 | $D_3$ .095 | 1.613 | 36.9 | 1.051 |
| $R_6-$ .265 | $D_4$ .015 | 1.558 | 31.5 | .999 |
| $R_7+$ 6.67 | $D_5$ .045 | 1.6252 | 56.1 | 1.007 |
| $R_8-$ .4753 | | | | |

Example II

| Radius | Thickness or air separation | Refractive index $n_D$ | Abbe V number | Relative partial dispersion |
|---|---|---|---|---|
| Equivalent focal length 1.000 | | Relative aperture F/2.9 | | |
| $R_1+$ .4803 | | | | |
| | $D_1$ .0565 | 1.6166 | 44.5 | 1.021 |
| $R_2-$ 1.047 | | | | |
| | $D_2$ .0188 | 1.558 | 31.5 | .999 |
| $R_3+$ .2924 | | | | |
| | $D_3$ .0660 | 1.613 | 36.9 | 1.051 |
| $R_4+$ 4.808 | | | | |
| | $S_1$ .0754 | | | |
| $R_5-$ .6680 | | | | |
| | $D_4$ .0236 | 1.613 | 36.9 | 1.051 |
| $R_6+$ .3604 | | | | |
| | $S_2$ .1159 | | | |
| $R_7+$ 1.172 | | | | |
| | $D_5$ .0565 | 1.613 | 59.3 | .999 |
| $R_8-$ .5221 | | | | |

In Example I the rear component is of triplet form with a divergent middle element of potassium bromide crystal cemented behind a convergent element of dense flint glass and in front of a convergent element of crown glass. The divergent simple middle component is of dense flint glass, and the convergent simple front component is of crown glass.

In Example II the front component is of triplet form with a divergent middle element of potassium bromide crystal cemented in front of a convergent element of dense flint glass, and behind a convergent element of barium flint glass. The divergent simple middle component is of dense flint glass, and the convergent simple rear component is of crown glass.

These examples both give good correction for secondary spectrum, as well as for the other aberrations.

What we claim as our invention and desire to secure by Letters Patent is:

1. An optical objective, corrected for spherical and chromatic aberrations, coma, astigmatism, field curvature and distortion, and having small zonal spherical aberration, and comprising three axially aligned components of which the front and rear components are convergent and the middle component divergent, one of the convergent components being in the form of a triplet having a divergent element made of potassium bromide crystal cemented between two convergent elements made of optical glass, whilst the other two components are simple and are made of optical glass, the objective approximately fulfilling the two equations $$\sum \frac{m^2_p}{f_p} \cdot \frac{1}{V_p} = 0 \text{ and } \sum \frac{m_p^2}{f_p} \cdot \frac{\alpha_p}{V_p} = 0$$

wherein $m_p$, $f_p$, $V_p$ and $\alpha_p$ respectively represent the magnification, the focal length, the Abbe V number and the relative partial dispersion of an element $p$ of the objective and the symbol $\Sigma$ indicates algebraical summation of the expressions for all the elements of the objective.

2. An optical objective, corrected for spherical and chromatic aberrations, coma, astigmatism, field curvature and distortion, and having small zonal spherical aberration, and comprising three axially aligned components of which the front and rear components are convergent and the middle component divergent, the divergent middle component and one of the convergent components being simple and made of optical glass, while the other convergent component is in the form of a triplet having a divergent element made of potassium bromide crystal cemented between two convergent elements made of optical glass, the numerical sum of the curvatures of the two external surfaces of the triplet lying between 35% and 50% of the numerical sum of the curvatures of the two cemented surfaces thereof, while the numerical sum of the radii of curvature of the front and rear surfaces of the whole objective lies between 0.8 and 1.8 times the equivalent focal length of the objective.

3. An optical objective, corrected for spherical and chromatic aberrations, coma, astigmatism, field curvature and distortion, and having small zonal spherical aberration, and comprising three axially aligned components of which the front and rear components are convergent and the middle component divergent, the divergent middle component and one of the convergent components being simple and made of optical glass, while the other convergent component is in the form of a triplet having a divergent element made of potassium bromide crystal cemented between two convergent elements made of optical glass, the radius of curvature of the cemented surface of the triplet component nearer to the divergent middle component lying between 0.2 and 0.4 times the equivalent focal length of the objective, while the radius of curvature of the external surface of the triplet component remote from the divergent middle component lies between 0.3 and 0.7 times such equivalent focal length, and the radius of curvature of the surface of the divergent middle component nearer to the simple convergent component lies between 0.3 and 0.7 times such equivalent focal length.

4. An optical objective as claimed in claim 3, in which the numerical sum of the curvatures of the two external surfaces of the triplet component lies between 35% and 50% of the numerical sum of the curvatures of the two cemented surfaces of such component, while the numerical sum of the radii of curvature of the front and rear surfaces of the whole objective lies between 0.8 and 1.8 times the equivalent focal length of the objective.

5. An optical objective, corrected for spherical and chromatic aberrations, coma, astigmatism, field curvature and distortion, and having small zonal spherical aberration, and comprising three axially aligned components of which the front component is convergent and consists of a triplet having a divergent element made of potassium bromide crystal cemented between two convergent elements made of optical glass, the rear component is simple and convergent and is made of optical glass, and the middle component is simple and divergent and is made of optical glass, the numerical sum of the curvatures of the two external surfaces of the triplet component lying between 35% and 50% of the numerical sum of the curvatures of the two cemented surfaces of such component, while the numerical sum of the radii of curvature of the front and rear surfaces of the whole objective lies between 0.8 and 1.8 times the equivalent focal length of the objective.

6. An optical objective, corrected for spherical and chromatic aberrations, coma, astigmatism, field curvature and distortion, and having small zonal spherical aberration, and comprising three axially aligned components of which the rear component is convergent and consists of a triplet having a divergent element made of potassium bromide crystal cemented between two convergent elements made of optical glass, the front component is simple and convergent and is made of optical glass, and the middle component is simple and divergent and is made of optical glass, the numerical sum of the curvatures of the two external surfaces of the triplet component lying between 35% and 50% of the numerical sum of the curvatures of the two cemented surfaces of such component, while the numerical sum of the radii of curvature of the front and rear surfaces of the whole objective lies between 0.8 and 1.8 times the equivalent focal length of the objective.

7. An optical objective as claimed in claim 5, in which the radius of curvature of the cemented surface of the triplet component nearer to the divergent middle component lies between 0.2 and 0.4 times the equivalent focal length of the objective, while the radius of curvature of the external surface of the triplet component remote from the divergent middle component lies between 0.3 and 0.7 times such equivalent focal length, and the radius of curvature of the surface of the divergent middle component nearer to the simple convergent component lies between 0.3 and 0.7 times such equivalent focal length.

8. An optical objective as claimed in claim 6, in which the radius of curvature of the cemented surface of the triplet component nearer to the divergent middle component lies between 0.2 and 0.4 times the equivalent focal length of the objective, while the radius of curvature of the external surface of the triplet component remote from the divergent middle component lies between 0.3 and 0.7 times such equivalent focal length, and the radius of curvature of the surface of the divergent middle component nearer to the simple convergent component lies between 0.3 and 0.7 times such equivalent focal length.

9. An optical objective as claimed in claim 5, in which the divergent simple middle component and the convergent simple component are respectively made of dense flint glass and of crown glass.

10. An optical objective as claimed in claim 6, in which the divergent simple middle component and the convergent simple component are respectively made of dense flint glass and of crown glass.

11. An optical objective as claimed in claim 1, in which dense flint glass is used for the divergent simple middle component and for one of the convergent elements cemented to the crystal element, whilst crown glass is used for the simple convergent component.

12. An optical objective as claimed in claim 5, in which dense flint glass and barium flint glass are used respectively for the two convergent elements cemented to the crystal element, whilst the divergent middle component and the convergent rear component are made respectively of dense flint glass and of crown glass.

13. An optical objective as claimed in claim 6, in which dense flint glass and crown glass are used respectively for the two convergent elements cemented to the crystal element, whilst the divergent middle component and the convergent front component are made respectively of dense flint glass and of crown glass.

14. An optical objective having numerical data substantially as set forth in the following table:

| Equivalent focal length 1.000 | | Relative aperture F/2.7 | | |
|---|---|---|---|---|
| Radius | Thickness or air separation | Refractive index $n_D$ | Abbe V number | Relative partial dispersion |
| $R_1+$ .4604 | | | | |
| | $D_1$ .08 | 1.610 | 53.5 | 1.016 |
| $R_2+$ 3.378 | | | | |
| | $S_1$ .100 | | | |
| $R_3-$ .540 | | | | |
| | $D_2$ .025 | 1.6214 | 36.1 | 1.051 |
| $R_4+$ .385 | | | | |
| | $S_2$ .118 | | | |
| $R_5+$ 1.760 | | | | |
| | $D_3$ .095 | 1.613 | 36.9 | 1.051 |
| $R_6-$ .265 | | | | |
| | $D_4$ .015 | 1.558 | 31.5 | .999 |
| $R_7+$ 6.67 | | | | |
| | $D_5$ .045 | 1.6252 | 56.1 | 1.007 |
| $R_8-$ .4753 | | | | | in which $R_1$ $R_2$ ... represent the radii of curvature of the individual lens surfaces, the positive sign indicating that the surface is convex to the front (that is to the side of the longer conjugate) and the negative sign that it is concave thereto, $D_1$ $D_2$ ... represent the axial thicknesses of the individual elements, and $S_1$ $S_2$ the axial air separations between the individual components.

15. An optical objective having numerical data substantially as set forth in the following table:

| Equivalent focal length 1.000 | | Relative aperture F/2.9 | | |
|---|---|---|---|---|
| Radius | Thickness or air separation | Refractive index $n_D$ | Abbe V number | Relative partial dispersion |
| $R_1+$ .4803 | | | | |
| | $D_1$ .0565 | 1.6166 | 44.5 | 1.021 |
| $R_2-$ 1.047 | | | | |
| | $D_2$ .0188 | 1.558 | 31.5 | .999 |
| $R_3+$ .2924 | | | | |
| | $D_3$ .0660 | 1.613 | 36.9 | 1.051 |
| $R_4+$ 4.808 | | | | |
| | $S_1$ .0754 | | | |
| $R_5-$ .6680 | | | | |
| | $D_4$ .0236 | 1.613 | 36.9 | 1.051 |
| $R_6+$ .3604 | | | | |
| | $S_2$ .1159 | | | |
| $R_7+$ 1.172 | | | | |
| | $D_5$ .0565 | 1.613 | 59.3 | .999 |
| $R_8-$ .5221 | | | | | in which $R_1$ $R_2$ ... represent the radii of curvature of the individual lens surfaces, the positive sign indicating that the surface is convex to the front (that is to the side of the longer conjugate) and the negative sign that it is concave thereto, $D_1$ $D_2$ ... represent the axial thicknesses of the individual elements, and $S_1$ $S_2$ the axial air separations between the individual components.

ARTHUR WARMISHAM.
CHARLES GORRIE WYNNE.